April 28, 1942.　　　M. STÖSSEL　　　2,280,864
MOLD
Filed May 22, 1939
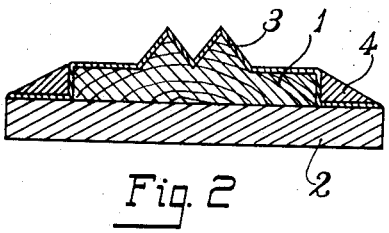
Fig. 1
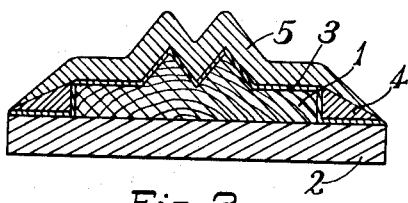
Fig. 2
Fig. 3
Fig. 4
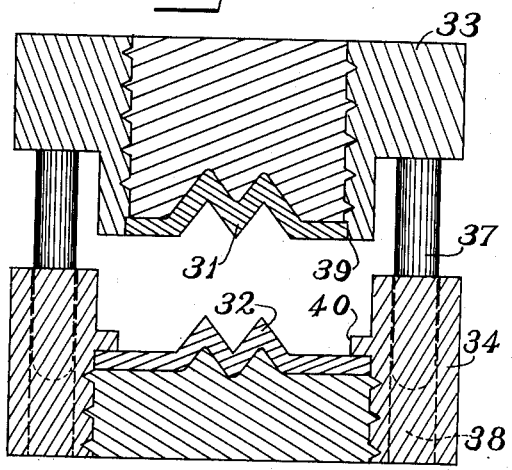
Fig. 5
INVENTOR.
Max Stössel
BY Davis, Lindsey, Smith & Shonts
ATTORNEYS Patented Apr. 28, 1942

2,280,864

UNITED STATES PATENT OFFICE 2,280,864

MOLD

Max Stössel, Chicago, Ill., assignor to Otto Stossel, Chicago, Ill.

Application May 22, 1939, Serial No. 274,951
In Great Britain January 11, 1938

6 Claims. (Cl. 22—190)

My invention relates to the production of spray metal negatives of models and particularly the production of molds, dies, patterns, or the like, of the type that are particularly useful in the casting or molding of plastics such as synthetic resins, rubber, Celluloid or glass and the like.

At the present, molds for this use are generally produced by cutting the molds from solid metal blocks by means of machining and engraving tools. This method involves considerable time and expense and is not commercially practicable for low-cost production, except when the molds thus made are used in mass production, where the cost of the mold can be distributed over numerous products made therefrom. Even then the length of time necessary to produce a mold is a material drawback.

A few attempts have been made to produce molds for this work by spraying metal upon a model or a positive and thus forming a mold or negative. Such attempts were unsuccessful because of distortion and inaccuracy and the tendency of the sprayed metal to peel off the model, particularly when spraying with metals having a fusion point above 600° C. This tendency to peel is apparently due to uneven thermal stresses produced in the metal when it is sprayed upon the model and is particularly prevalent when the metal is sprayed to a thickness exceeding 0.1 millimeter, or 0.0025 inch. This "peeling" makes it impossible to spray an accurate negative or mold having sufficient strength or rigidity for any practical use, i. e., to resist the normal pressures present in molding operations.

It is the purpose of my present invention to produce an accurate and usable negative or mold economically and commercially by spraying a model, either the original or a reproduced model, in such a manner as to overcome the heretofore mentioned difficulties, as well as other defects and limitations.

Further objects and their resultant advantages will be apparent from the following description taken in connection with the following drawing in which:

Figure 1 is a vertical section illustrating one manner in which the first step of preparing the first negative or mold may be performed;

Fig. 2 is a vertical section illustrating the second step in making the negative;

Fig. 3 is a vertical section illustrating the third step in making the negative;

Fig. 4 is a vertical section illustrating a different manner of preparing the model and making a mold therefrom;

Fig. 5 is a vertical section of a finished, divided or separable mold.

In carrying out the simplest form of my invention, the model 1 or master pattern of the article to be reproduced and for which a mold is to be made is placed upon a support 2 preferably in the form of an iron plate, the supporting surface of the plate first being prepared by roughening in any suitable manner, as by sand-blasting or etching before the model is placed thereon. When permissible, the model may also be roughened upon its outer surface before placing it on the roughened supporting surface of the plate.

In some cases it is desirable to heat the plate 2 to a temperature of 150° to 300° C. to further resist the tendency to "peel." The metal of which the mold is to be made is then sprayed over the model 1 and the surrounding marginal portion of the supporting plate 2 in a very thin layer 3, preferably not to exceed 0.1 millimeter or 0.0025 inch in thickness, as shown in Fig. 1. This single layer 3 of sprayed metal is allowed to cool, after which the sprayed metal layer is thickened by further spraying successive layers 4 around the marginal portion on the supporting plate only, as shown in Fig. 2. This marginal area on the plate is preferably thickened by repeated layers 4 until it has reached approximately the thickness of the model. The first sprayed metal 3 penetrates the roughened surface of the plate, adheres firmly thereto and, in combination with the added layers, counteracts the inherent stresses of the thin metal layer on the model and prevents the latter from peeling off the support and the model, which peeling usually occurs at the lower or terminating edge of the model. After the marginal region of the supporting plate has reached the desired thickness and has cooled, the coating over the entire model 1 and the marginal area can be increased in thickness by further spraying, preferably by spraying successive applications or layers 5 over the entire model as in Fig. 3, allowing each layer to cool until the thickness of the coating over the model has reached the desired degree such, for example, as 10 to 20 millimeters.

After the sprayed metal has reached the desired thickness the model 1 with its coating or mold 5 may be removed from the supporting plate 2 and the form or negative mold 5 separated from the model 1. The thickened marginal area of layers 4 may then be cut away to any desired degree.

The sprayed metal negative or mold may be used either for the production of another model or reproduction of articles like the first model.

The material of which the sprayed mold is to be made may be selected according to the conditions to which it is to be subjected or the use to which it is to be put. For example, aluminum or aluminum alloys, bronze or similar metals may be used if little strain is to be put on the mold or if the number of articles to be made therefrom is small. If, however, the mold is to be used for mass production, or if for any other reason it must be of harder material, such, for example, as steel, nickel, or chrome-nickel alloys, it may be necessary in some instances, depending upon the material of the first model, to make a positive or second model from the first mold or negative made from the first or master model. This is true when the first model is for example made of relatively soft materials such as wood, plaster of Paris or fibrous material because, obviously, metals of high fusion points cannot be sprayed directly upon models of such materials. In such cases, a first negative or mold is made of a metal of low melting point in the manner just described. For this purpose, such metals as tin, zinc or cadmium may be used. The first negative or mold made in this manner is then used for the production of a second model or positive from which a second negative or final mold is made.

When a relatively soft metal mold is made for producing a second model as described in connection with Figs. 1 to 3, it is sometimes desirable to reinforce the mold. In such instances the first mold may be made for instance as follows: Referring to Fig. 4, there is illustrated a model 1, made of for example wood, which is to be reproduced. This model is the first or master model and may be roughened, if necessary, by any suitable means, such as sanding or sandblasting, and is then coated with a thin layer 3ª of tin or other suitable metal of low melting point by spraying the top and sides of the model, as shown in Fig. 4. After the first coating and thickened margin has cooled, a reinforcing cage or wire form 7 shaped as closely as possible to the form of the model, may be placed over the coated model. Alternatively, as illustrated in Fig. 4, the coated model, prior to the placing of the metal form or insert 7 thereon, may be first provided with an additional coating of another suitable metal such as zinc. After this, the additional layers 5ª of zinc or similar material are sprayed over the entire coated model and form so as to completely cover the coated model and wire form. The layers 5ª of zinc may be increased to any desired thickness by repeated sprayings to form a negative or mold which, because of the thickness of the zinc coating and the added rigidity of the wire 7, has sufficient strength to withstand the use to which it is to be put. After the zinc has reached the desired thickness, the negative or mold made up of the layer 3ª of tin, wire form 7, and layers 5ª of zinc, is separated from the positive or master model 1 and the flashing or rim 100 may be removed by any suitable method, such as chiseling or milling.

In the specific mold making process illustrated in Fig. 4, the model has preferably received a spray metal coating, composed of two different metals, forming the coating 3a of suitable low melting point metal such as tin and the coating 5a of a harder metal such as zinc. The resulting combined spray metal mold may be used with advantage where it is desired to make from the same by the metal spray process a duplicate of the original model, as for instance by spraying onto the face of the mold a higher melting point metal and recovering a substantial duplicate of the original model by melting off the low melting point coating. This procedure is particularly advantageous where the surface of the original model does not permit the direct spraying with a particular spray metal as previously set forth.

In certain classes of molding, both surfaces of the molded article must be finished. In such cases, a two-part final mold must be employed. In Fig. 5, there is illustrated a two-part mold of this character, both parts of the mold being made in accordance with the procedure outlined above. Such a mold is particularly adaptable to the manufacture of articles of synthetic resins and comprises two parts 31 and 32, both made by the spraying of high melting point metals upon a model, as previously outlined. Each of the portions of the mold is preferably supported in frames 33 and 34, respectively, which are backed with suitable material to give the necessary rigidity to the two sections of the mold. The two portions of the mold are provided with studs 37 and guides 38, respectively, to cause proper approach of the two sections of the mold when they are brought together.

It is preferred to form the two sections of the mold with cutting surfaces 39 and 40 of hardened steel which cut off the flash of synthetic resins as the mold sections are brought together and thus relieves the mold sections from performing the cutting and thus relieving them from certain strains during the pressing processes.

It will be obvious to those skilled in the art that molds may be produced in accordance with the foregoing much quicker than the usual weeks of time now required and at a cost materially less than heretofore. Furthermore, accurate molds may be produced of relatively soft metal at a very low cost, which molds are wholly satisfactory and adequate for the reproduction of a few articles when such are desired for samples or small consumption rather than for mass production. Heretofore it was economically impossible to do this because of the expense in producing a mold.

It will be apparent to those skilled in the art that minor variations and deviations from the foregoing as described may be indulged in without departing from the spirit and scope of this invention, as defined in the appended claims.

I claim:

1. Method of preventing warping in the manufacture of a spray metal mold which comprises applying a relatively thin coherent coat of spray metal to a model and marginal member positioned substantially around and immediately adjacent to said model, at least part of said coat overlying said model being so bonded as to be strippable from said model and at least part of said coat overlying said marginal member being relatively highly bonded to said marginal member, thereafter spraying metal on the coated model until said model is covered with metal to the desired thickness, removing substantially intact the spray metal shell thus formed overlying said model and recovering a substantially accurate non-warped spray metal negative of said model.

2. Method in accordance with claim 1 in which said marginal member is surface roughened to receive and retain spray metal with a high degree of bond prior to the first mentioned spraying with metal thereon.

3. Method of preventing warping in the manufacture of a spray metal mold which comprises applying a relatively thin coherent coat of spray metal to a model and marginal member positioned substantially around and immediately adjacent to said model, at least part of said coat overlying said model being so bonded as to be strippable from said model and at least part of said coat overlying said marginal member being relatively highly bonded to said marginal member, spraying additional metal on said coat overlying said marginal member until a substantial thickness of spray metal is formed thereon, thereafter spraying metal on the coated model until said model is covered with metal to the desired thickness, removing substantially intact the spray metal shell thus formed overlying said model and recovering a substantially accurate non-warped spray metal negative of said model.

4. Method in accordance with claim 3 in which said marginal member is surface roughened to receive and retain spray metal with a high degree of bond prior to the first mentioned spraying with metal thereon.

5. Method of preventing warping in the manufacture of a spray metal mold which comprises positioning a marginal member substantially around and immediately adjacent to a model, surface roughening said marginal member sufficient to receive and retain spray metal with a relatively high degree of bonding, applying a relatively thin coherent coat of spray metal to said model and marginal member, at least part of said coat overlying said model being so bonded as to be strippable from said model and at least part of said coat overlying said marginal member, being relatively highly bonded to said marginal member, thereafter spraying metal on the coated model until said model is covered with metal to the desired thickness, separating the spray metal coat substantially overlying said marginal member from the spray metal coat substantially overlying said model, removing substantially intact the spray metal shell thus formed overlying said model and recovering a substantially accurate non-warped spray metal negative of said model.

6. Method in accordance with claim 5 in which additional metal is sprayed on said coat overlying said marginal member until a substantial thickness of spray metal is formed thereon.

MAX STÖSSEL.